United States Patent [19]

Clark

[11] 3,724,655
[45] Apr. 3, 1973

[54] CAP TESTER

[75] Inventor: Charles William Clark, Randolph, N.Y.

[73] Assignee: Borden, Inc., Columbus, Ohio

[22] Filed: Dec. 17, 1971

[21] Appl. No.: 209,041

[52] U.S. Cl. .................209/73, 209/82, 209/80, 209/75, 73/45.1
[51] Int. Cl. .................................................B07c 5/06
[58] Field of Search..........209/73, 74, 75, 80, 82, 88; 73/37.5, 37.8, 37, 38, 45.1

[56] References Cited

UNITED STATES PATENTS

| 3,015,388 | 1/1962 | Wilckens | 209/82 X |
| 3,310,142 | 3/1967 | Hausen et al. | 209/80 X |
| 3,318,137 | 5/1967 | Denlinger et al. | 209/80 X |
| 3,432,033 | 3/1969 | Everett | 209/80 X |

Primary Examiner—Allen N. Knowles
Attorney—George P. Maskas et al.

[57] ABSTRACT

Apparatus for testing thickness of gaskets in caps and for rejecting caps which have gaskets of a thickness outside of a set range, the apparatus being characterized by a first sensing means responsive to gas leaking through the gasket which tests for a minimum set thickness, a second sensing means which is actuated by a floating head when it encounters a gasket exceeding the maximum set thickness and a sorting means which is responsive to the first and second sensing means to eject caps with non-specification gaskets.

11 Claims, 12 Drawing Figures

PATENTED APR 3 1973 3,724,655

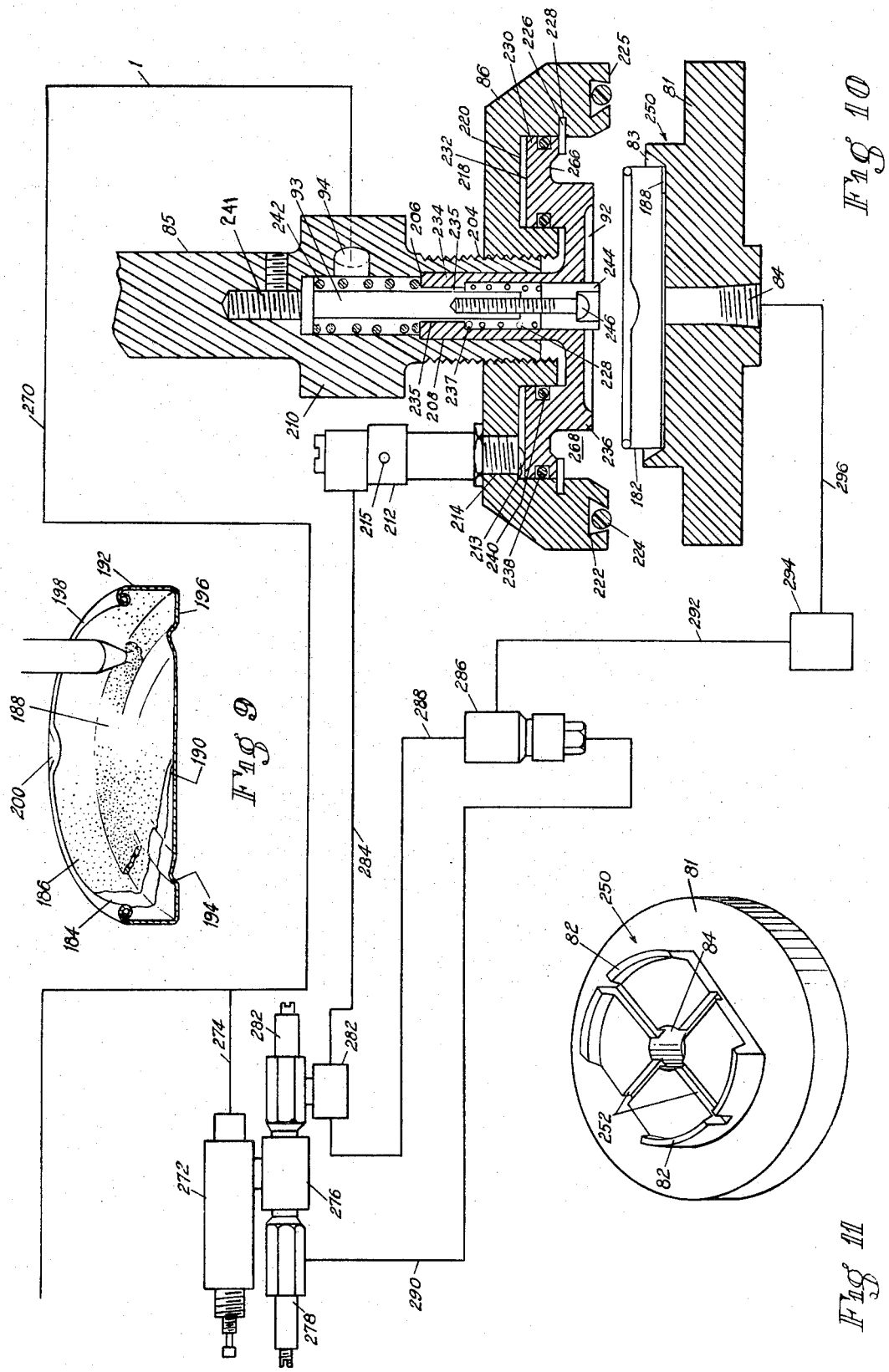

CAP TESTER

This invention relates to an apparatus for checking the thickness of resilient gaskets in closure caps which are provided for hermetically sealing glass containers and for rejecting caps in which the thickness of the gasket is outside of a predetermined range.

Closure caps or covers are utilized in large quantities for sealing containers of various types. Reference here is made especially to glass containers where the closure caps used to seal the containers are of the hidden lug variety. It should be understood that the present invention can also be used in connection with other types of closures such as continuous thread type, press-o-closure and others.

Generally speaking, the type of closure cap used in connection with the present invention, has a metal cap body having a cover panel and a depending skirt. A gasket-receiving channel is usually provided around the outer margin of the cover panel and an annular gasket, formed from suitable material such as plastisol, is disposed in this channel so that when the cap is forced down onto the top of the glass container, the rim of the container presses into the gasket and forms a seal therewith. To keep the cost of the cap to a minimum, the gasket is made as thin as possible, consistent with the normal variations and irregularities of the rims.

During the manufacture of the closure caps, it is not always that a gasket of uniform thickness is provided in the cap. Some gaskets are thicker than others and some gaskets have sections which are not uniform in thickness and leave gaps or voids when the cap is applied onto a container and thus allow air and contaminating matter to enter the container.

A gaskets falling outside a predetermined thickness range cannot be tolerated. A gasket which is too thin will not provide hermetic sealing and will therefore, permit air and other matter to enter the container and contaminate the contents thereof. With many products, hermetic sealing is relied on to maintain the product in wholesome condition and prevent its spoilage. It is apparent that a contaminated or spoiled product can be very costly in terms of liability on the implied warranty that the product is wholesome and fit for its intended use. Furthermore, a cap provided with a gasket which is too thin will not be screwed tight. The cap can become easily unscrewed, spilling the contents thereof and causing clean-up difficulties.

In the case where the gasket in the closure cap is too thick, the glass container can rupture under the strain of the automatic machine which is used to apply closure caps to glass containers. Here again, this condition must be avoided since conveyor belts carrying the glass containers must be halted in order to clean up the mess.

The above-mentioned problems encountered with closure caps provided with gaskets which do not meet specification thickness, are not hypothetical but are daily problems encountered in plant operations. There is a need for a device which can assure that thickness of the gaskets in closure caps applied to containers is within certain predetermined limits and which device can automatically reject closure caps with gaskets which are either too thick or too thin. Such a device must also be capable of rejecting closure caps wherein only a portion of the gasket is not within a predetermined thickness range.

This invention relates to an apparatus which sorts closure caps provided with gaskets falling within a predetermined thickness range from closure caps having gaskets of a thickness which is outside of the predetermined thickness range.

A preferred embodiment of the invention is illustrated in the accompanying drawings wherein:

FIG. 9 is a perspective sectional view of a closure cap showing the gasket and the different coatings used to form a secure bond between the metal, the coatings and the gasket;

FIG. 10 is a partial sectional view of a closure cap station showing the arrangement of the lower and the upper chuck in conjunction with a spring-loaded sealing ring; and FIG. 11 is a top view of the lower chuck showing its construction in detail which permits air to escape from within when the spring-loaded sealing ring is brought to rest on the plate supporting the lower chuck.

FIG. 12 is a cross-sectional view of the interface between the stationary and rotary valves.

FIG. 8 is a flat, expanded projection view of the arcuate cam;

Figure 1:
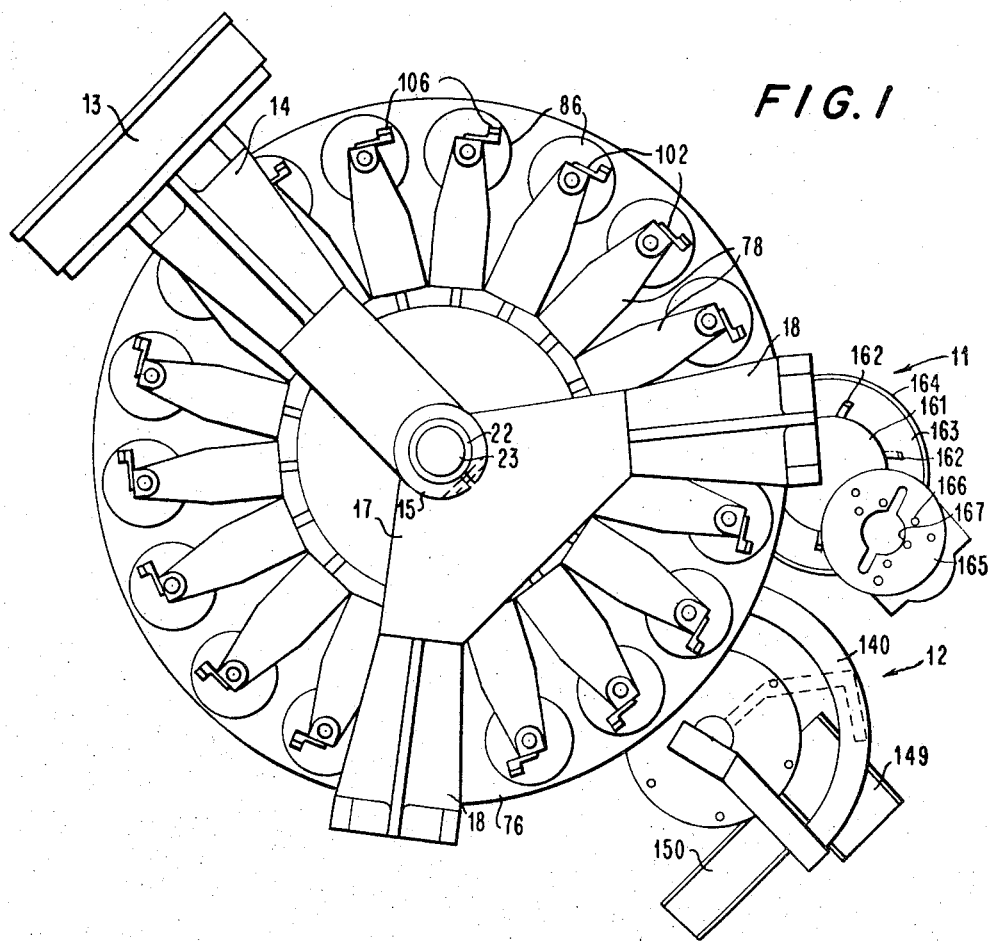
FIG. 1 is a top view of the apparatus which includes a plurality of closure cap testing stations arranged in a circle, each being mounted for axial rotation.
Figure 2:
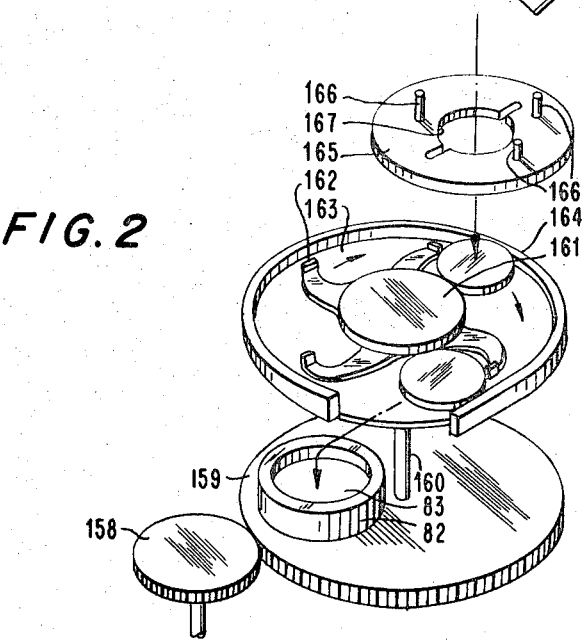
FIG. 2 is a schematic illustration of the feeding device which is associated with the cap testing apparatus and which performs the function of inserting the caps into the apparatus for the test.

Referring now to the preferred embodiment of the present invention and more particularly to the illustration in FIGS. 1 and 2, there is shown a cap or cover tester 10 which includes feeding apparatus 11 and sorting apparatus 12. The cover tester may be suitably supported on a frame, legs or the like, and includes support members 18 having a horizontally projecting brace 14. The brace 14 includes a cylindrical center section 15 with an opening for receiving an upwardly projecting sleeve assembly 22. The opening is suitably split to clamp rigidly onto the sleeve assembly and prevent it from turning with shaft 23. The supporting brace 14 includes a horizontally disposed gusset 17, which terminates in two L-shaped bracing members 18 spaced 120° from one another in the horizontal plane. The free ends 19 of the L-shaped bracing members project downwardly and mount a two-section semicircular cam surface 20. The two sections define a cam slot 21 therebetween which opens at both ends, as is shown in the flat, expanded projection view of FIG. 8.

Figure 4:
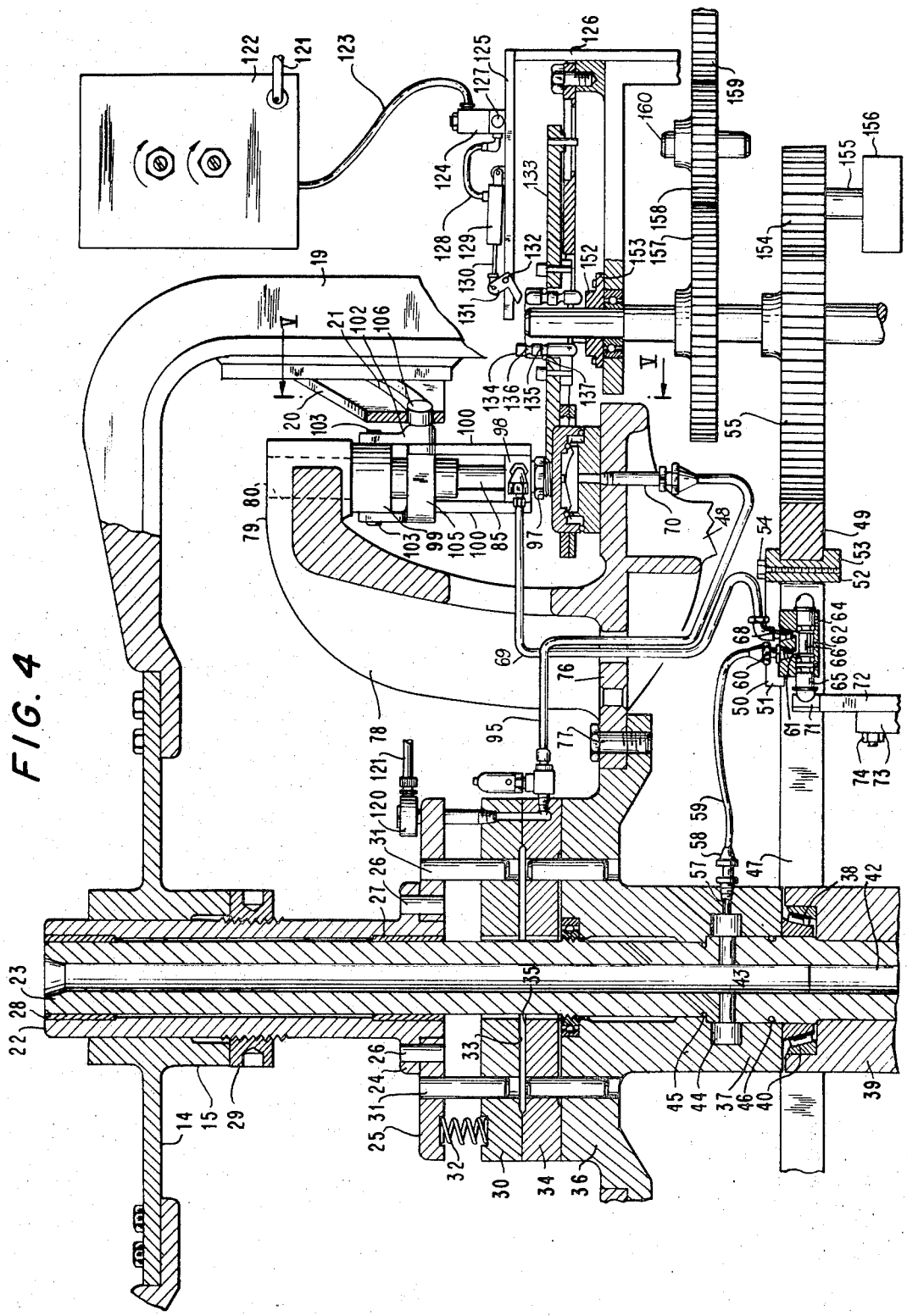
FIG. 4 is a transverse cross-sectional view of the apparatus illustrating the valve in the test position.

The vertically disposed sleeve assembly 22, shown in detail in FIG. 4, includes a hollow, rotating inner shaft 23. The fixed sleeve assembly extends downwardly along the hollow shaft and terminates in an outwardly flared flange portion 24. Mounted on the sleeve 22 adjacent the flange portion 24 is a circular disk 25 which is secured to the flange by pins 26 projecting through vertically aligned bores provided in the flange and the supporting disk and suitable secured therein. Bearings 27 and 28 are provided between the sleeve 22 and the hollow shaft portion 23 to stabilize the two members. The cylindrical portion 15 of brace 14 allows the sleeve assembly 22 to be adjusted vertically by threaded collar 29 to apply sealing pressure to valves 30 and 34, as will appear hereinafter. Coaxially disposed with respect to shaft 23 and spaced vertically beneath the supporting disk 25, is a stationary valve portion 30. The valve member 30 is prevented from moving relative to the supporting disk member 25 by pins 31 which are provided in vertically aligned bores in both members. Angularly spaced about the adjacent faces of the disk 25 and vale member 30 are a plurality of biasing springs 32 which insure that an equally distributed downward force is exerted on the valve member 30 for reasons to be hereinafter set forth. Juxtaposed with valve member 30 and also coaxially arranged with respect to shaft 23 is a rotary valve member 34 which forms an airtight interface with the stationary valve 30 at the outer portion thereof. Both valve members include recessed portions 33 and 35 provided adjacent the shaft member 23. The rotary valve 34 rests on an annular support member 36 which includes an outward horizontally projecting annular flange and a downwardly projecting sleeve portion 37. The sleeve 37 is mounted for rotation with shaft 23 and rests on a tapered annular flange 38 provided on the shaft. The rotary valve 34 and the support member 36 are secured together for concurrent rotary motion by pins provided in vertically aligned bores in both members. Spaced vertically beneath the sleeve portion 37 of the support member 36 is a fixed sleeve portion 39 having an upper tapered counterbore into which the annular flange 38 is received. Thrust bearings 40 are provided in the counterbore to mount the support member 36 for rotation and additional bearings are suitably provided to permit member 36 to move with shaft 23.

The shaft 23 is provided with a longitudinal bore 42 which receives a gas under pressure from a conventional source through the bottom thereof and is plugged at the top to prevent escape of the gas. Preferably, a gas under a pressure of about 8 p.s.i. is used. Angularly spaced horizontal bores 43 are provided about the periphery of the hollow shaft 23 which allow communication of the bore 42 with manifold 44 in sleeve 37. To insure that the gas supplied to the manifold 44 does not escape along the interface of the shaft 23 and the sleeve 37, conventional O-rings 45 and 46 are provided, as shown in FIG. 4. An annular ring 47 concentric with the axis defined by shaft 23 is provided and is suspended in relation thereto in a manner to be more specifically set forth.

Disposed in the same horizontal plane of the ring 47 and having a greater inner diameter is an annular ring gear 49 having teeth about the periphery thereof. The ring gear 49 is suitably secured to the annular disk 47 by spaced interconnecting strip 50 having a flange portion 51 welded or otherwise affixed to the annular ring 48. L-shaped members 52 having flanges 53 which contact the lower surface of gear 49 are secured to the horizontally disposed connecting strips 50 by suitable means such as bolts 54. The gear 49 is grasped between flange 53 and the free end of strip 50 and therefore the ring 47 and annular ring gear 49 are secured for common rotational movement.

A plurality of angularly spaced bosses 48 on an annular support member 76 connected to member 36 are welded to the upper surface of gear 49 and suspended the gear and ring assembly 47, 49 therebeneath, as well as assuring rotational movement of the assembly and the support member. A spur gear 55 is fixedly mounted on an upwardly disposed rotatable shaft 56 and meshes with the annular gear 49. The spur gear 55 also meshes with a spur gear 154 mounted on the armature 155 of a motor means 156, which may be of a well-known type. For example, a pneumatic, hydraulic or electric motor will service to drive the spur gear 154. It should be appreciated that other elements mounted on shaft 56 will be driven in timed relationship with the rotating support member 36.

In the preferred embodiment, a plurality of testing units are provided, each of which comprises a spool valve arrangement in the ring 47 which controls the flow of gas from the manifold 44 to a testing cell mounted on the annular support member 76. The annular support member 76 is secured to the annular flange of member 36 as spaced points by bolts 77. The support member includes a plurality of goosenecks 78 angularly spaced thereon, one gooseneck for each testing unit. Each gooseneck terminates in a horizontally disposed portion 79 having a vertical bore 80 provided therein. Therefore, each unit is angularly spaced about the axis defined by the shaft 23 and is moved along a circular path of travel as the ring 47 and support member 36 rotate. Reference hereinafter will be made to the elements of only one of the testing units of the preferred embodiment, it being understood that each of the units is structurally the same.

Figure 3:
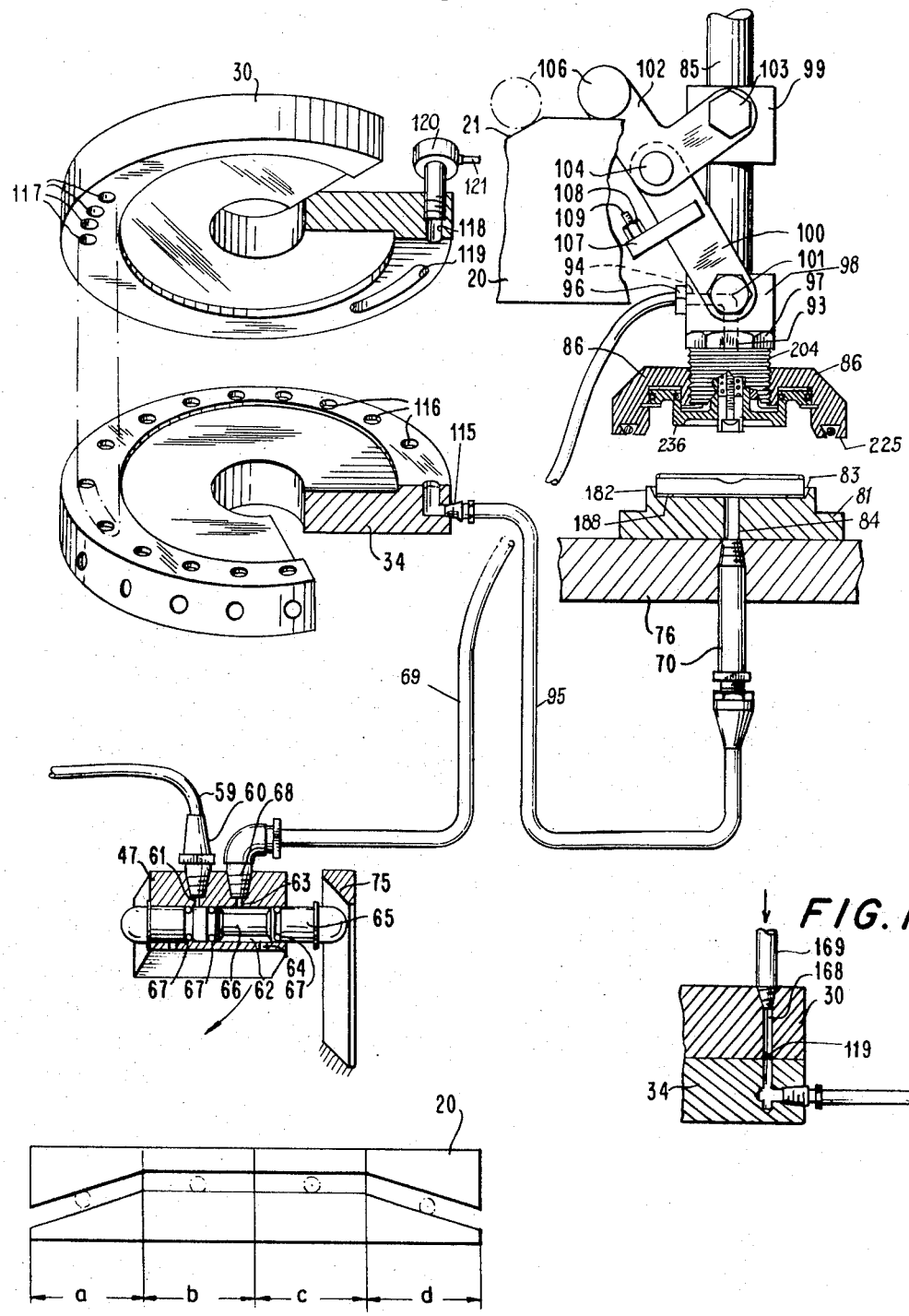
FIG. 3 is a detailed perspective view of the testing apparatus with the valve in the exhaust position.

Each test unit includes a conduit 59 which communicates with the manifold 44 through a bore 57 provided in the sleeve and radially aligned with the valve and cell assemblies of the unit. A conventional fitting 58 connects the conduit to the bore 57 and the free end of the conduit is provided with a fitting 60 which directs the flow of gas to a vertically disposed inlet port 61 in ring 47, as is best seen in FIG. 3. The port 61 communicates directly with an enlarged, transverse bore 62 which receives the test unit spool valve assembly. Spaced laterally from the port 61 and also communicating with transverse bore 62 are ports 63 and 64, the former being an outlet passage from the transverse bore 62 to the test chamber and the latter being open to the atmosphere to drain gas from the unit when desired. A cylindrical spool 65, having an inwardly recessed portion 66 near the midpoint thereof, is slidably received within the bore 62 and includes a conventional stops at both ends thereof to limit the movement between two extreme positions in the bore, as seen in FIGS. 3 and 4. Conventional O-rings 67 are mounted on the spool 65 on both sides of the recessed portion 66 with an additional O-ring spaced from the detent portion on the same side of the spool at inlet port 61. The spool is normally situated in one or the other of its two extreme positions and the O-rings serve to prevent the escape of gas along the interface of the spool 65 and the bore 62, as well as directing the flow of the gas received in port 61 to the port 63 in the test position, illustrated in FIG. 4, and conversely, to close-off port 61 and allow the gas conveyed through port 63 to flow back and out of drain port 64 to purge the cell of the test unit to the atmosphere, as shown in FIG. 3. A conduit 69 receives the flow of pressurized gas through port 63, when the spool valve is in the test position, and is connected to the port 63 by a conventional L-fitting 68. At the other end of the conduit is a conventional fitting 96 which is mounted in an aperture provided in shaft 85. Since the flow of gas to or from the fitting 96 governed entirely by the position of the spool valve 65, it is important to note how the spool valve is moved between its two positions.

In the test position of the valve shown in FIG. 4, there is illustrated a cam member 71 integrally formed on the support 72. The support is mounted on a fixed upright brace 73 by bolt 74 adjacent the inner end of ring 47. Thus, as the ring 47 is rotated, the spool valve 65 in the test position of FIG. 4 contacts the cam 71 and is moved laterally outwardly in the transverse bore to the exhaust position illustrated in FIG. 3. Cam member 75, illustrated in FIG. 3, is located at another point along the path of rotational movement but between the outer edge of the ring 47 and the inner edge of gear 49, and is contacted when the spool valve 65 is to be shifted inwardly back to the test position.

Referring now to the chamber or cell of the subject test unit, shown in FIGS. 3 and 4, there is shown a circular base 81 secured to support member 76 having a circular lip 82 on the upper surface which defines a cavity 83 in the lower portion of the cell into which the cap is placed. A bore 84 through the base communicates with the cavity 83 and is aligned with the fitting 70 secured in an aperture in the support member 76. A shaft 85 is slidably received in the bore 80 of the gooseneck and includes at the lower end thereof a disk 86 having a depending rim 87 at the outer edge.

An annular groove is provided in the rim 87 for housing O-ring 90 which engages the upper surface of base 81 to hermetically seal the cell in closed position. In the closed position with the cap disposed on base 81, a second cavity 92 is defined in disk 86. FIG. 10 illustrated details of the cap holder, which will be described later.

A vertical bore 93 is formed in the disk 86 which communicates with cavity 92 and extends upwardly into the shaft 85 where it intersects a horizontally disposed bore 94. A conduit 69 communicates with the bore 94 and is connected thereto by conventional fitting 96.

Figure 5:
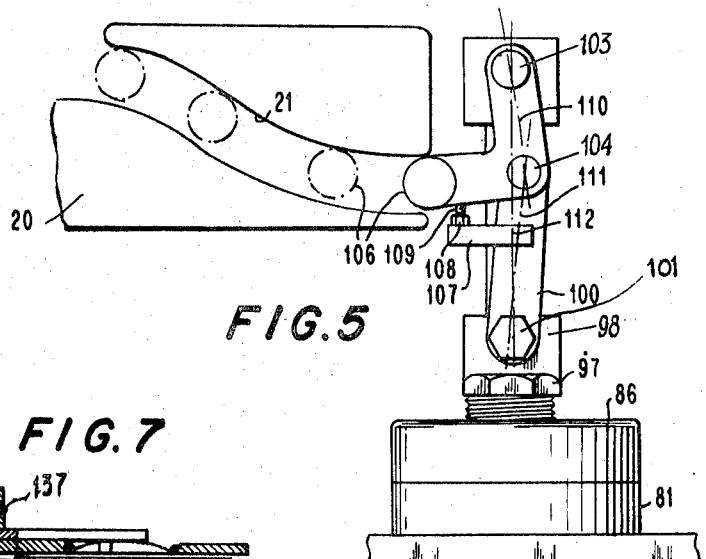
FIG. 5 is a front view of the test chamber in the closed position.

The cell of each test unit must be opened and closed to insert and remove the cover being tested. To carry out this operation, the shaft 85 is reciprocated in the bore 80 between the open position illustrated in FIG. 3 and the closed position illustrated in FIGS. 4 and 5. The shaft 85 terminates adjacent the base of the disk 86 is a hexagonal portion 97 with a fillet section securing the disk to the hexagonal position. A sleeve 98 is mounted on the shaft above the hexagonal portion 97 and fixedly secured thereto as by welding or the like. Vertically spaced above the sleeve 98 is a second sleeve 99 which is rigidly attached to the underside of the horizontal portion of the gooseneck 78, and is vertically aligned with the bore 80 through which the shaft 85 moves. On either side of the sleeve portion 98 is a link 100 which is pivotally mounted by pin 101 in trunnion fashion and extends upwardly from the point of pivotal connection on the sleeve. A pair of bell cranks 102 are pivotally connected by pins 103 to the sleeve 99 in trunnion fashion and are additionally pivoted to the links 100 by pins 104 at the angle of the bell crank. Both bell cranks are interconnected by a cross-link 105 for concurrent actuation. A roller 106 is rotatably mounted on the free end of the bell crank nearest the cam surface 20 and rides in the cam slot 21. Thus, vertical movement of the roller in the cam slot actuates the linkages 100, 102 which control vertical movement of the shaft 85 and thereby effect opening and closing of the cell. Fixedly secured to one of the links 100 is an outwardly projecting strip 107 which includes a nut portion 108 fastened at the free end thereof and a threaded bolt 109 which serves as an adjustable stop member in the closed position of the cell by contacting the adjacent bell crank, as seen in FIG. 5. As is also seen in FIG. 5, lines drawn along the axis of the bell crank between the pivot point 103 and 104 and a second line drawn along the axis of the link 100 between the pivot point 101 and 104 to the bell crank intersect at an angle with respect to the line drawn between the pivot point 101 and 103 when the cell is fully closed, and thus the bell crank and link move to an over center position when the bolt 109 contacts bell crank 102 to lock the cell in the closed position.

The conduit 95 which communicates with cavity 83 of the cell member includes a conventional fitting 115 which connects the conduit to an L-shaped bore 116 in the rotary valve 34. As is shown in FIG. 3, the rotary valve 34 contains a plurality of such L-shaped apertures or bores 116, each of which communicates with the cell of its respective testing unit. The L-shaped bore 116 communicates directly with the interface between the rotary valve 34 and the stationary valve 30. Thus, it is apparent that as the valve 34 is rotated about the axis defined by shaft 23, the pressure changes which occur in the cavity 83 of the cell are programmed by the configuration of the face of the stationary valve 30. The face of stationary valve 30 includes a series of closely spaced apertures 117 having a common radius on the axis defined by shaft 23 which pass through the valve member to the atmosphere. Spaced clockwise from the apertures 117 at a substantial angular distance therefrom on the face of the valve 30 is a vertically disposed bore 118. A transducer 120, or other similar apparatus which converts volumetric gaseous quantities into equivalent electric signals, is provided in the bore 118 which is communicable with the bore 116 when the two are aligned. Spaced angularly counterclockwise from the bore 118 is an upwardly opening slot 119 which opens to the atmosphere. An electric conductor 121 is suitably connected to the transducer 120 and interconnects the latter member to a conventional amplifier 122 so that electrical signals generated by the transducer are amplified for further use in the testing apparatus.

It should be observed from studying the face of the stationary valve 30 that a considerable dwell period exists in the angular distance between the apertures 117 and the bore 118 so that a lapse of time, depending on the rotational speed of the valve 34, occurs between the time cavity 83 is exposed to atmospheric pressure via the bores 117 and the time that the transducer in bore 118 is aligned with the bore 116 to sense any pressure buildup in the cavity 83.

Figure 6:
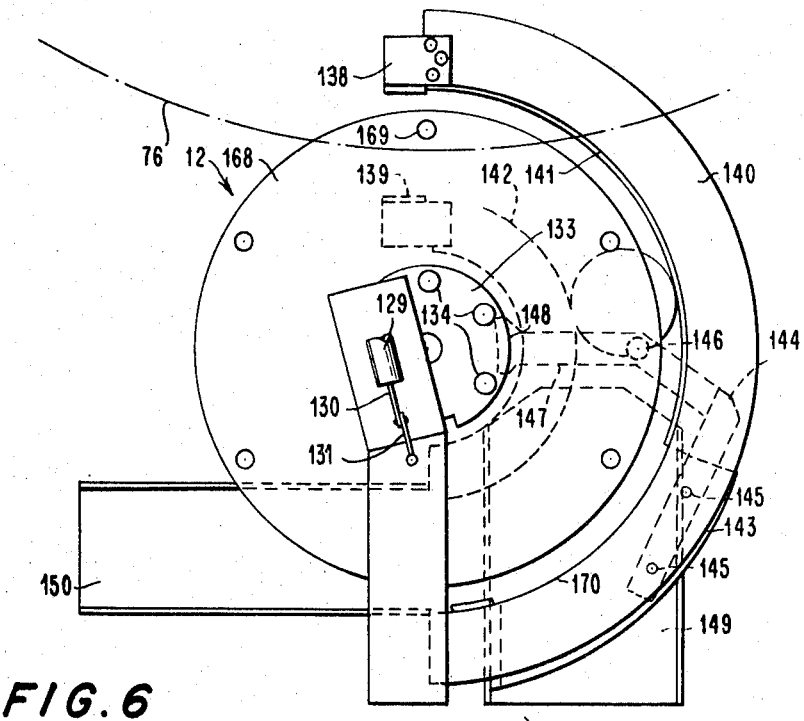
FIG. 6 is a top view of the sorting device which is adapted for dropping specification closure caps in one hopper and non-specification caps in another hopper.

The amplifier 122 is of a well-known type used to receive a milliampere signal and amplifies same and then transmits it to another station. A conductor 123 interconnects the amplifier to a solenoid controlled valve assembly 124 which is of the type which receives an electric signal to control the flow of gas supplied to the valve. The solenoid valve is mounted on a horizontally disposed brace 125 which is rigidly mounted on an upright stanchion member 126, as is best seen in FIG. 4. Gas is supplied to the solenoid valve arrangement 124 via a conduit 127 from a suitable source. A conduit 128 connected to the outlet port of the valve conveys the flow of gas received and controlled by the solenoid valve to an air cylinder 129 pivotally mounted on the brace 125. The cylinder includes a piston 130 connected to bell crank 131, the latter member being pivotally connected to the horizontal brace 125 adjacent a suitably positioned opening therein by means of pin 132. A memory wheel 133, best seen in FIGS. 4 and 6, is mounted on shaft 56 and is vertically spaced beneath the opening in the horizontal brace 125.

A plurality of vertically movable pins 134 are angularly spaced about the wheel near the edge and at a radial distance from the shaft 56 which will place them beneath the free end of bell crank 131 as the wheel is rotated. Each pin 134 is provided with a pair of spaced circumferential detents 135 and 136. Suitably mounted in the memory wheel 133 adjacent each of the pins 134 is a garter spring 137 which is adapted to engage one or the other detents to retain the pin in a fixed position with respect to memory wheel 133. Only a slight axial force need be applied to the pin 134 at the upper end thereof to move the pin downwardly from a raised position when the spring member 137 engages the detent 135 to a lowered position when the spring member 137 engages the detent 136. Each pin is designed to be moved from the raised position to the lower position by a downward force exerted by bell crank 131 against the top of the pin when the cylinder 129 is actuated.

Actuation of the cylinder is, of course, effected when the transducer 120 senses a buildup of pressure in the cavity 83 of the cell and transmits an electric signal to the amplifier 122 which actuates the solenoid valve 124 to direct a flow of gas to the cylinder. It should also be appreciated that the memory wheel 133 rotates in timed relationship with the movement of the rotary valve bore 116 of each test unit so that as one of the bores 116 aligns with the bore 118 which mounts the transducer, one of the pins 134 is aligned with the bell crank 131 so that a buildup of pressure in the cell sensed by the transducer will result in the instantaneous movement of the bell crank 131 to depress the aligned pin 134 to its lower position. Conversely, if no buildup of pressure is sensed by the transducer 120, no movement of the bell crank 131 takes place. This latter operation, therefore, serves to record the results of any leakage which might occur due to seepage of gas through the gasket. After maintaining pressure on the gasket in the cavity 92, the pressure is released when the spool valve 65 engages the cam member 75 and is moved to the exhaust position of FIG. 3. The inlet port 61 is thus closed and the gas in cavity 92 drains back through port 63 to the atmosphere through drain port 64.

Thereafter, it is desired to remove the cover from cell and sort it according to the results of the test recorded by the memory wheel 133. The cell is opened by upward movement of shaft 85 induced by the roller 106 following an upward path in cam slot 21 to break the over center latch position of the linkage 100, 102 and move the shaft up. The support member 76 rotates the cell of the test unit into a position adjacent the sorting apparatus 12, best seen in FIG. 6, and a pair of skimming wedges 138 and 139 lift the cover off the rim 82 and place it onto circular guide member 140 having a path defined by the upstanding arcuate flanges 141 and 142. A disk 168, fixedly secured to the shaft 56, is juxtaposed beneath the circular guide 140 and includes a plurality of spaced upstanding pins 169 which engage the covers as they are removed from the moving cells and advance them along the path defined between the flanges. It should be observed that a radial line drawn from the axis defined by shaft 56 to the pins 134 could be extended further outwardly and a pin 169 on the disk 168 would align with each of these radial lines. This, of course, means that each memory pin represents the recorded results of the tested cover being advanced by the radially aligned pin 169.

Figure 7:
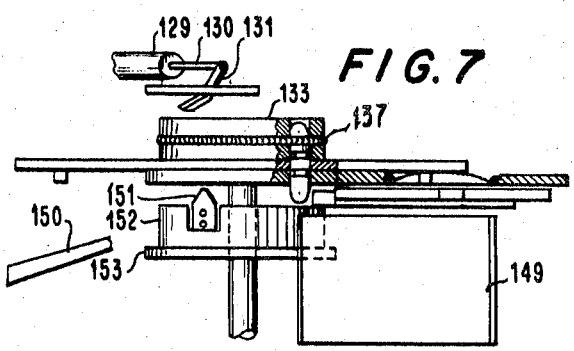
FIG. 7 is a side view of the sorting device showing in detail the mechanism for actuating the reject system.

An arcuate section 143, having a curved upstanding flange 170 similar to flange 141, is aligned with the circular guide 140 and is retained in this aligned position by a blade member 144 on which the arcuate section is maintained by brads 145 or the like. The blade 144 is mounted on the circular guide portion 140 for pivotal movement on pin 146. The blade 144 is normally retained in the position illustrated in FIG. 6 with flange 170 arcuately aligned with flange 141 by suitable biasing means such as a torsion spring suitably mounted on the pin 146. An arm portion 147 on the blade extends inwardly and has mounted on the free end a cam 148 which lies in the path of travel of a depressed pin 134 on the memory wheel and is engageably by this pin. Thus, when the pin 134 has been depressed indicating a leaky cover, and engages the cam 148, the arm 147 is swung in a counterclockwise direction and the flange 170 is moved out of alignment with flange 141 and out of the path of travel defined by the circular guide. The movement of the cover along the circular path defined by the flanges 141 and 142 imparts an outward centrifugal force to the cover and by moving the arcuate section 143 out of alignment with the path defined by 141, this force is sufficient to move or direct the cover to the reject chute 149. In the event that the pin is not depressed, indicating the cover is leak-proof, the cover will continue to follow the path defined by the circular guide 140 and arcuate flange 170 into the leak-proof cover chute 150. After the sorting operation is completed, the pin is reset to its raised position by cam 151, best seen in FIG. 7. The reset cam 151 is mounted on a flange portion 152 on disk member 153.

Also mounted on the shaft 56 and driven in timed relation to the other rotating elements, is a spur gear 157 which drives another spur gear 158. The gear 158 meshes with spur gear 159 which drives the feeding apparatus 11 of the present invention, as is best seen in FIG. 2. Spur gear 159 is fixedly secured to shaft 160 which projects upwardly and to which is fastened a star wheel 161. The star wheel includes outwardly projecting arm portions 162 which are used to move the covers to be tested into position over the rim 82 of each cell. A fixed horizontal disk 163 lies in juxtaposed relation beneath the star wheel 161 and includes an upwardly projecting arcuate lip 164 along the edge which has an opening at a point adjacent the path of travel of the rim 82 of each test unit on the support 76. Covers are applied to the star wheel feed assembly 11 by placing a stack of such covers between upwardly projecting posts 166 on ring 165 to direct the flow of covers by gravity through the aperture 167 in the ring to be driven by the star wheel. The described feed apparatus is of a well-known type in the cover testing industry and is set forth herein for illustrative purposes only, since it does not comprise a part of the claimed invention.

Having thus described the physical apparatus of the present invention, a detailed description of the operation of this apparatus will now be set forth.

Referring to the top view of FIG. 1 and to the projection view of FIG. 8, it is seen that the feeding apparatus 11 directs the insertion of covers into the cells of the various test units angularly spaced about the support member 76. Immediately after insertion of the cover into the cell from the feed apparatus, the roller 106 on the linkage 100, 102 follows the downward path of the cam slot 21 of arcuate cam 20 over the path defined in section D in FIG. 8. The linkage then swings to the over center locked position of FIG. 5 and the cover is clamped in the cell between cavities 83 and 92. Once the roller has passed the open end of the cam slot, the spool valve 65 encounters cam 75 and the cylindrical spool is moved to the test position illustrated in FIG. 4. Gas under pressure passes from manifold 44 through the spool valve to the cavity 92 of the cell. At the same instant, the spool valve is shifted to the test position, the bore 116 is in vertical alignment with the aperture 117 on stationary valve 30. Thus, the cavity 83 is open to the atmosphere and is at an atmospheric pressure.

The bore 116 abuts the solid smooth face of the stationary valve 30 throughout the rotation of the test cell on support member 76 around the area viewed in FIG. 1 and just prior to the time roller 106 again encounters cam slot 21, this time in the section defined as A in FIG. 8. Prior to the entry of roller 106 into cam slot 21 at the open end in section A, bore 116 aligns with bore 118, having the transducer 120 at the upper end thereof. Any buildup of pressure in the cavity 83 due to seepage of gas through the cover gasket is sensed by the transducer and instantly passed to the amplifier to be sent to the solenoid valve 124 to actuate the pin depressing assembly of the recording apparatus. Once this sequence of events has taken place, the spool valve 65 engages the cam 71 and is shifted to the exhaust position of FIG. 3. The gas contained in the cavity 92 drains through the bore 63 and out drain port 64 to the atmosphere. At the same time, the cavity 83 is reduced to atmospheric pressure due to the alignment of bore 116 with the slot 119.

Immediately after the bore 116 encounters the slot 119, the roller 106 engages the upwardly inclined cam slot 21 at the area A and the over center latch position of the linkage is broken. The shaft 85 is shifted upwardly to open the cell and allow removal of the cover therefrom by the stripping wedges 138 and 139 so that the covers may be sorted by the sorting apparatus 12.

FIG. 9 illustrates a conventional twist-off closure cap 182 which is tested for thickness of its gasket by the apparatus described herein. The cap 182 is made from a sheet of metal, such as tinplate, which is first coated with a primer coating 184 to permit a more secure bond between the tinplate and organosol coating 186. Usually, both sides of the tinplate are coated with the primer to prevent corrosion. The primer is conventional lacquer or enamel used for protecting metal from corrosion.

The tinplate with the primer coating is baked in an oven to bond the primer securely to the tinplate and a coating organosol 186 is applied thereover. Organosol thicknesses of between 0.0005 to 0.002 inch give good bond between the organosol coating 186 and plastisol gasket 188 to be subsequently applied. After the tinplate is coated with organosol, it is cured at elevated temperature to obtain a secure bond with the primer coating.

Organosols are well known coatings in the textile field and plastisols are used for gasket material in closure caps. Examplary compositions of organosols and plastisols are given on pages 553 to 560 in Rubber Age, Volume 67, No. 5 for Aug. 1950.

The organosol coated tinplate is then shaped into a closure, such as cap 182 shown in FIG. 1, which includes a cover portion 190 and a skirt portion 192. The cover portion 190 has a downwardly directed shoulder 194 formed in spaced relationship to the skirt portion 192 which forms a gasket-receiving channel 196 in the cover portion 190. The lip of the skirt portion 192 is curled into a bead 198 from which a plurality of retaining lugs 200 are formed to lock the cap on the container.

After the cap is formed, it is placed on a rotating chuck and plastisol is delivered into gasket-receiving channel 196 to form gasket 188 which substantially fills channel 194. The plastisol is then fluxed at 350° F. into a rubber-like sealing material which forms a secure bond with organosol coating 186.

FIG. 10 illustrates the details of the device for testing the thickness of gasket 188 in closure cap 182. The upper portion of the device is supported by vertically reciprocable shaft 85 provided with a threaded portion 204 at its lower extremity and counterbores 210 and 208. Annular shoulder 206 divides the bore 93 into a larger diameter bore 208 and a smaller diameter bore 210 concentric with bore 208. Air under pressure can be delivered into the bores through port 94 in shaft 85. Pilot sensor 212 is securely fitted in threaded bore 214 of disk 86. Pilot sensor 212, which is equipped with a spring mounted plunger 213, can be adjusted to protrude a desired distance into threaded bore 214 and locked in place with a lock nut. When plunger 213 is actuated, it vents pressurized air in pilot sensor 212 through opening 215.

Disk 86, having a centrally threaded bore 218, is secured on the threaded portion 204 of shaft 85. Disk 86 has an annular channel 220 and an annular groove 222 where sealing O-ring 224 is retained. The outer portion of disk 86 is defined by peripheral ridge 225.

Snap ring 226 is disposed within annular groove 228 is disk 86 and supports upper chuck 230. Annular ridge 232 of upper chuck 230 fits snugly within channel 220 of disk 86 and its stem 234 is positioned within bore 208 in shaft 85. Stem 234 has a bore 235 wherein a shoulder 237 provides abutment for a compression spring, as will be described. Disk 236 protrudes from the body of chuck 230 to a level removed inwardly from peripheral ridge 225 of disk 86. The extent of protrusion of disk 236 beyond upper chuck 230 is critical, as will be later explained. A circular cavity 92 is provided in disk 236 for passage of pressurized gas to protrusion of disk 236. The protrusion disk 236 simulates the sealing surface of the container contacting gasket 188 of the closure. Sealing O-rings 238, 240 assure hermetical seals between the cooperating surfaces of upper chuck 230 and disk 86. Upper chuck 230 is spring-mounted on shaft 85 by means of a compression spring 242 disposed in bore 210. Spring 242 abuts the shoulder of screw 241 at the upper end and rim of stem 234 at the other. Compression spring 242 maintains upper chuck 230 yieldably in contact with snap ring 226 disposed in annular grove 228. The space between ridge 232 and channel 220 allows vertical movement of the upper chuck 230.

Bumper 244 is a cylindrical element which has a number of axial grooves on its exterior surface to permit air to pass from bore 93 into cavity 92. Bumper 244 is maintained within bore 235 of stem 234 by means of threaded bolt 246 and is biased by compression spring 248 which is contained between shoulder 237 and the upper surface of bumper 244. The bumper serves as a positive means for ejecting a closure cap away from the upper chuck in case the cap sticks to the chuck.

Lower chuck 250, disposed on base 81, nestles cap 182, as shown in FIG. 10. As better illustrated in FIG. 11, lower chuck 250 is formed like a circular pedestal on base 81 with a pair of segments removed at directly opposite sites. It includes confining segmental rims 82 for facilitating positioning of the caps on the chuck. Channels 252 criss-cross the floor of the chuck and communicate with centrally disposed bore 84. Bore 92 communicates with fitting 70 to convey leaking gas to the transducer which actuates the reject mechanism.

Before operation of the testing device is commenced, adjustments must be made so that caps with gaskets having a thickness falling outside a defined range are rejected. The acceptable thickness range can generally be described as one between a minimum and a maximum acceptable thicknesses. Adjustment for minimum acceptable thickness is made by selection or adjustment of the proper lower chuck 250 so that rim of the cap skirt portion 192 abuts surface 266 when a seal is affected between disk 236 and gasket 188 of a thickness corresponding to the minimum acceptable thickness. Although the rim of the cap skirt portion may abut surface 266, at no time will a hermetic seal be affected at this point. The presence of the lugs and imperfections on the rim of the skirt portion will create voids or gaps which will allow passage of air. Adjustment for maximum acceptable thickness is made by screwing pilot sensor in or out of threaded bore 214 so that plunger 213 of pilot sensor contacts annular ridge 232 of upper chuck 230 whenever a gasket is encountered of a thickness exceeding the maximum acceptable thickness.

Operation of the device illustrated in FIG. 10 is commenced by positioning cap 182 on lower chuck 250 and moving upper chuck 86 so that it rests on the lower chuck and forms chamber 268 therewith. In this position, skirt 192 of the cap circumscribes disk 236 with the disk resting on gasket 188. Air under pressure, which may be 4 – 8 psi, is introduced into line 270 which conducts it to the interior of shaft 85 through port 94 and counterbore 210. Pressurized air enters cavity 92 by way of the axial grooves on bumper 244.

Pressurized air in line 270 is also directed to pressure regulator 272 through line 274. From pressure regulator 272 air is conducted to a tee 276 which distributes it to needle valves 278, 280. Air delivered to tee 282 from needle valve 280 is conveyed to pilot sensor 212 through line 284 and to valve 286 through line 288. Pressurized air in line 288 maintains spring-mounted valve 286 closed to pressurized air in line 290. When gasket 188 exceeds maximum acceptable thickness, upper chuck 230 is pushed upward and annular ridge 232 depresses spring-mounted plunger 213 in pilot sensor 212. Counterbalancing pressurized air in line 284 is vented to atmosphere thru opening 215 of pilot sensor. With the release of counterbalancing air in line 288, spring in valve 286 opens valve 286 and allows pressurized air in line 290 to pass through valve 286 into line 292 to actuate the mechanism 294 to reject a cap which has a gasket exceeding specification thickness. The reject mechanism 294 can also be actuated by pressurized air seeping through line 296 from chamber 268.

In the position where a cap is disposed on the lower chuck and the upper chuck is brought to rest on the lower chuck, a seal will be effected between disk 236 and gasket 188 if the gasket thickness is greater than a predetermined minimum. A minimum thickness of 0.037 inch has been established, however, it should be understood that this can be changed to suit particular conditions. If the gasket thickness is greater than 0.037 inch, a seal will be established between disk 236 and the gasket with the result that no air will escape from cavity 92 into chamber 268 and out through opening 84 to actuate reject mechanism 294. If the gasket thickness is less than 0.037 inch, then the rim of the cap will abut against surface 266 leaving a gap between the gasket and disk 236 for air to pass into chamber 268, opening 264 and through line 296 to actuate the reject mechanism which will reject the defective cap into a reject hopper, as will be fully described later.

When a cap is tested which has a gasket of a thickness which exceeds the predetermined maximum value, i.e., greater than 0.046 inch in this instance, then upon contact with the gasket, upper chuck 230 will be raised off snap ring 236 and against the compressive force of spring 242 to contact and thus actuate pilot sensor 212. Actuation of the pilot sensor vents pressurized air in line 284 to the atmosphere through opening 215 and thus reduces air pressure in lines 284 and 288 to substantially atmospheric. This venting has the effect of opening valve 286 releasing pressure on the spring in the valve. When valve 286 is opened, pressurized air in line 290 is conveyed to cap reject mechanism 294 which will selectively dispose of the defective cap.

As described above, the device can be adjusted to test for any range or gasket thicknesses. When a gasket is of a thickness which is outside a predetermined range, the device rejects the gasket whether it is too thin or too thick. This holds true for gaskets which have either gaps or ridges which fall outside of the predetermined thickness range.

As should be apparent from above description, cap reject mechanism 294 generally refers to valve members 30, 34 as well as to transducer 120, amplifier 122 and the sorting device 12, with their associated component parts.

As described above, the device can be adjusted to test for any range or gasket thicknesses. When a gasket is of a thickness which is outside a predetermined range, the device rejects the gasket whether it is too thin or too thick. This also holds true for gaskets which have either gaps or ridges which fall outside of the predetermined thickness range.

As should be apparent from above description, cap reject mechanism 294 generally refers to valve members 30, 34 as well as to transducer 120, amplifier 122 and the sorting device 12, with their associated component parts.

I claim:

1. Apparatus for testing thickness of gaskets on caps comprising
   a cell for receiving the cap whereby the cap divides said cell into first and second sections;
   supply means of pressurized gas;
   means for injecting the gas into said first section;
   first valve means interposed between said supply means and said first section to control gas injection;
   means for venting the gas from said first section;
   second separate valve means connected to said second section;
   first sensing means communicable through said second valve means to detect pressure build-up due to gas leakage through the gasket into said second section;
   second sensing means mounted on said cell for detecting thickness of the gasket exceeding a predetermined maximum and,
   sorting means responsive to said first and said second sensing means for ejecting caps with gaskets having a thickness outside predetermined minimum and maximum.

2. Apparatus of claim 1 wherein said sorting means includes a recording means operatively associated with said sensing means to record leaks in the cap, and means responsive to said recording means for ejecting leaky caps.

3. Apparatus for testing thickness of gaskets on caps comprising a plurality of cells mounted on a common support; means for rotating said cells through a series of stations whereby a cap is fed into the open cell, the cell is closed, pressurized gas is admitted to test if thickness of the gasket is within a predetermined, range, the cap is expelled from said apparatus and sorted; cam track means in associated with said apparatus for closing each cell in succession after a cap has been positioned within a cell and for opening each cell in succession after testing of the gasket has been completed prior to expulsion of the cap from a cell; means for feeding caps into said cells; means for successively injecting pressurized gas into each cell; first valve means interposed in said injection means to control injection of gas conduit means for conveying gas from said cell; means for sorting caps on the basis of whether the gasket thickness is within or outside of a predetermined range; second valve means connected with said conduit means for first sensing means communicable through said second valve means to detect pressure build-up due to gas leakage through the gasket; second sensing means mounted on each cell for detecting caps having gaskets of a thickness exceeding a predetermined maximum; and sorting means responsive to said first and said second sensing means for ejecting caps with gaskets of a thickness which is outside of a predetermined range.

4. Apparatus of claim 3 wherein each of said cells comprises a base; cradle for caps mounted on said base; an opening through said base and said cradle; channel means in the floor of said cradle in communication with said opening; a shaft disposed above said base and mounted for travel on said cam track; a bore provided in bottom portion of said shaft; a port in communication with said bore; first disk affixed to the lower extremity of said shaft and having an annular channel which forms a peripheral ridge; a sealing means disposed in said ridge; support means protruding into said annular channel; second disk disposed in and spaced from said channel of said first disk resting on said support means; a cavity in said second disk forming a peripheral ridge which extends to a level above the ridge on said first disk; a bore through said second disk in communication with said bore in said shaft and said cavity; sealing means in association with said first and said second disks to provide hermetical seal between said disks; and means for introducing pressurized gas through said port into said bore in said shaft.

5. Apparatus of claim 4 wherein said second sensing means includes an adjustable stem which protrudes into said channel in said first disk to contact said second disk when a gasket is encountered with a thickness exceeding a predetermined maximum, said first disk forming a second chamber when it is brought in contact with said base and said first disk forming a first chamber when it is brought in contact with the gasket, the gas being admitted into the first chamber and leaks into said second chamber whenever a gasket thickness is below a predetermined minimum.

6. Apparatus of claim 5 including a valve and a first and second tees, said first tee receives pressurized gas and has a first and second outlets with said second tee being connected to said second outlet; a line connecting said second tee with said second sensing means and a separate line connecting said second tee with said valve; another line connecting said second outlet or said first tee with said valve and another separate line connecting said valve with said sorting means and still another separate line connecting said sorting means with said opening through said base and said cradle; said valve is in a normally closed condition until actuation of said second sensing means by a gasket exceeding the maximum predetermined thickness which results in venting of the gas to the atmosphere and draining of the gas from said lines connecting said second tee to said second sensing means and said valve which in turn opens said valve to allow the gas in said line connecting said valve with said second outlet to enter said line connecting said sorting means with said valve to actuate said sorting means in order to eject a cap with a gasket which exceeds the predetermined maximum.

7. Apparatus of claim 6 wherein said second disk includes an elongated portion with a peripheral abutment, the skirt portion of a cap fitting around said elongated portion with its rim in contact with said abutment when said disk is resting on the gasket having a thickness exceeding the predetermined minimum.

8. Apparatus of claim 7 wherein said second disk includes a hollow stem disposed concentrically within the bore of said shaft and yieldably mounted means within said stem for assisting in separating caps from said second disk.

9. Apparatus of claim 3 wherein said cell includes a base and a cradle for caps disposed in said base; a first disk and a second disk loosely supported within said first disk; means for providing hermetical seal between said first and said second disks; said cam track means serving to move said first disk together with said second disk in contact with said base whereby said first disk forms hermetical chamber with said base and said second disk forms a cavity with a cap positioned in said cradle.

10. Apparatus of claim 9 wherein said second sensing means includes a plunger which actuated said second sensing means when it comes in contact with said second disk.

11. Apparatus of claim 10 wherein said second disk is yieldably mounted within said first disk.

* * * * *